(12) United States Patent
Lin

(10) Patent No.: US 9,674,253 B2
(45) Date of Patent: Jun. 6, 2017

(54) METHOD FOR ALLOCATING A SPECIFIC PORTION OF MULTIMEDIA FILE AND SKIPPING THE SPECIFIC PORTION AUTOMATICALLY AND ELECTRONIC DEVICE THEREOF

(71) Applicant: AmTRAN TECHNOLOGY Co., Ltd., New Taipei (TW)

(72) Inventor: Shih-Pin Lin, New Taipei (TW)

(73) Assignee: AmTRAN TECHNOLOGY Co. Ltd., New Taipei (TW)

( * ) Notice: Subject to any disclaimer, the term of this patent is extended or adjusted under 35 U.S.C. 154(b) by 182 days.

(21) Appl. No.: 14/176,152

(22) Filed: Feb. 10, 2014

(65) Prior Publication Data

US 2015/0113153 A1 Apr. 23, 2015

(30) Foreign Application Priority Data

Oct. 22, 2013 (TW) .............................. 102138146 A

(51) Int. Cl.
*G06F 15/16* (2006.01)
*H04L 29/06* (2006.01)
*H04L 29/08* (2006.01)
*G06F 17/30* (2006.01)

(52) U.S. Cl.
CPC ...... *H04L 65/602* (2013.01); *G06F 17/30017* (2013.01); *H04L 63/10* (2013.01); *H04L 65/601* (2013.01); *H04L 67/06* (2013.01)

(58) Field of Classification Search
CPC .. H04L 63/10; H04L 65/601; G06F 17/30017
USPC .................. 709/217–219, 227–229, 231–232
See application file for complete search history.

(56) References Cited

U.S. PATENT DOCUMENTS

| | | | | |
|---|---|---|---|---|
| 7,117,231 B2* | 10/2006 | Fischer | ................ | H04N 21/235 707/999.01 |
| 7,203,702 B2* | 4/2007 | Pachet | ............. | G06F 17/30017 707/999.104 |
| 7,493,106 B2* | 2/2009 | Espelien | ........... | H04L 29/06027 709/228 |
| 7,565,429 B1* | 7/2009 | Fernandez | ............. | G06Q 30/02 709/231 |
| 8,370,827 B2* | 2/2013 | Rosset | ............. | H04L 29/06027 717/168 |
| 8,472,792 B2* | 6/2013 | Butt | ....................... | G11B 20/10 348/409.1 |

(Continued)

FOREIGN PATENT DOCUMENTS

CN 101354745 1/2009
CN 102497594 6/2012

OTHER PUBLICATIONS

"Office Action of China Counterpart Application," issued on Dec. 5, 2016, p. 1-p. 8, in which the listed references were cited.

*Primary Examiner* — Bharat N Barot
(74) *Attorney, Agent, or Firm* — Jianq Chyun IP Office

(57) ABSTRACT

A method for skipping title sequence of a multimedia file and an electronic device are provided. The method includes: obtaining a first portion feature data of a first multimedia file; obtaining a beginning time of a second portion of a second multimedia file according to the first portion feature data; and skipping a first portion of the second multimedia file prior to the beginning time of a second portion, and displaying the second portion of the second multimedia file.

16 Claims, 5 Drawing Sheets

(56) References Cited

U.S. PATENT DOCUMENTS

| | | | |
|---|---|---|---|
| 8,646,106 B2* | 2/2014 | White | G11B 20/00086 709/217 |
| 2009/0307185 A1* | 12/2009 | Chuang et al. | G11B 27/10 707/999.002 |
| 2010/0166018 A1* | 7/2010 | Gerard | H04L 65/602 370/474 |
| 2014/0101174 A1* | 4/2014 | Tsai | G06F 17/30064 707/752 |
| 2015/0128788 A1* | 5/2015 | Brewer | G10H 1/0008 84/609 |

* cited by examiner

METHOD FOR ALLOCATING A SPECIFIC PORTION OF MULTIMEDIA FILE AND SKIPPING THE SPECIFIC PORTION AUTOMATICALLY AND ELECTRONIC DEVICE THEREOF

CROSS-REFERENCE TO RELATED APPLICATION

This application claims the priority benefit of Taiwan application serial no. 102138146, filed on Oct. 22, 2013. The entirety of the above-mentioned patent application is hereby incorporated by reference herein and made a part of this specification.

BACKGROUND OF THE INVENTION

Field of the Invention

The present invention relates to an analysis technique of a multimedia file, and more particularly, to a method for skipping the title sequence of a multimedia file for an electronic device.

Description of Related Art

With the development of information sharing technology, the lives of modern people enjoy getting information over Internet. As such, Television users change the way they watching TV. Users have evolved from the passive reception mode with traditional analog or digital broadcasting systems into the interactive reception mode such as VOD (video on demand), Internet TV and smart TV. For example, users can use their TV to access multiple contents by clicking a movie, a TV program, a photo album and music or other multimedia video through Applications (apps) or Web browser over Internet.

However, when a user is using a TV and watching different episodes of a TV series over Internet. Generally, the title sequence of each episodes of the TV series are the same. As such, the user needs to manually skip the title sequence of a TV episode, for example, the antecedent summary and/or the title sequence theme song and so on. In more detail, for example, after watching the episode No. 1 of a TV series, and then, the user would like to watch the episode No. 2 of the TV series. With respect to the title sequence theme song of the episode No. 2 is duplicated as that of the episode No. 1, in this case, the user may choose to skip the title sequence theme song to directly watch its substantial portion.

Although some currently available multimedia players on the market allow users to input a setting operation, for example, skipping the content of a movie or a TV program for several beginning minutes of presently playing, but the length of time for skipping in this way is fixed, unable to automatically lengthen or shorten the length of time according to whether a movie contains the antecedent summary, the length of the antecedent summary and/or whether commercial advertisings are interspersed prior to beginning the substantial portion, etc.

SUMMARY OF THE INVENTION

Accordingly, the present invention is directed to a method for skipping title sequence of a multimedia and an electronic device thereof, which can automatically skip the title sequence of the multimedia file to directly download and/or display the substantial portion of the multimedia file.

The present invention is directed to a method for skipping title sequence of a multimedia file, which can automatically skip the title sequence of the multimedia file to directly deliver the substantial portion of the multimedia file to an electronic device supposedly to browse the multimedia file.

The invention provides a multimedia file sharing system, in which a multimedia file sharing device can inform the electronic device of the beginning time of the substantial portion of a multimedia file so that the electronic device can directly display the substantial portion of the multimedia file.

The invention provides an electronic device able to obtain the beginning time of the substantial portion of a multimedia file from a multimedia file sharing device so as to directly display the substantial portion of the multimedia file.

The invention provides a method for skipping the title sequence of a multimedia file, the method applies to an electronic device, and the method includes: obtaining a first portion feature data of a first multimedia file; obtaining a beginning time of a second portion of a second multimedia file according to the first portion feature data; skipping a first portion of the second multimedia file prior to the beginning time of the second portion, and displaying the second portion of the second multimedia file.

In an exemplary embodiment of the present invention, the above-mentioned step of obtaining the first portion feature data of the first multimedia file includes: receiving a setting operation parameter; determining a beginning time of a first portion of the first multimedia file and an ending time of the first portion of the first multimedia file according to the setting operation parameter; analyzing the first multimedia file regarding the beginning time of the first portion and the ending time of the first portion to obtain the first portion feature data of the first multimedia file.

In an embodiment of the present invention, the above-mentioned first portion feature data includes one of an audio signal waveform and a video signal waveform or a combination of both audio signal waveform and video signal waveform thereof.

In an exemplary embodiment of the present invention, the above-mentioned step of obtaining the beginning time of the second portion of the second multimedia file according to the first portion feature data includes: matching the first portion feature data with the second multimedia file to obtain a portion in the second multimedia file which is consistent with the first portion feature data; setting an ending time of the portion in the second multimedia file which is consistent with the first portion feature data as the beginning time of the second portion of the second multimedia file.

In an exemplary embodiment of the present invention, the above-mentioned step of matching the first portion feature data with the second multimedia file to obtain the portion in the second multimedia file which is consistent with the first portion feature data includes: determining a matching duration, wherein the matching duration is less than full-length of the second multimedia file; obtaining a file content data to be matched of the second multimedia file in the matching duration; matching the first portion feature data with the file content data to be matched to obtain the portion in the second multimedia file which is consistent with the first portion feature data.

The invention also provides an electronic device, which includes a storage unit and a processing unit. The storage unit is used for storing a first multimedia file and a second multimedia file. The processing unit is coupled to the storage unit for obtaining a first portion feature data of the first multimedia file. The processing unit is further used for obtaining a beginning time of the second portion of the second multimedia file according to the first portion feature data. The processing unit is further used for skipping a first portion of the second multimedia file prior to the beginning time of the second portion, and displaying the second portion of the second multimedia file.

In addition, the invention provides another electronic device, which includes a network unit, a storage unit and a processing unit. The network unit is used for receiving a multimedia file from a multimedia file sharing device via Internet. The storage unit is used for storing the multimedia file. The processing unit is coupled to the network unit and the storage unit for obtaining a beginning time of the second portion of the multimedia file from the multimedia file sharing device through the network unit, and the processing unit is further used for skipping a first portion of the multimedia file prior to the beginning time of the second portion, and displaying the second portion of the multimedia file.

In an exemplary embodiment of the present invention, the above-mentioned beginning time of the second portion of the multimedia file is obtained by the multimedia file sharing device according to a first portion feature data of another multimedia file. The first portion feature data of the other multimedia file is obtained by the multimedia file sharing device through analyzing the other multimedia file regarding a beginning time of a first portion and an ending time of the first portion.

In an exemplary embodiment of the present invention, the above-mentioned beginning time of the second portion of the multimedia file is decided by the multimedia file sharing device according to an ending time of a portion in the multimedia file which is consistent with the first portion feature data of the other multimedia file.

In an exemplary embodiment of the present invention, the above-mentioned portion in the multimedia file which is consistent with the first portion feature data of the other multimedia file is obtained by the multimedia file sharing device through matching the first portion feature data with a file content data to be matched of the multimedia file in a matching duration, in which the matching duration is less than full-length of the multimedia file, and a beginning time of the matching duration is substantially same as a beginning time of the multimedia file.

Based on the depiction above, the invention can use the electronic device at a client or a multimedia file sharing device at a server to execute the matching operation on the title sequence feature data of a multimedia file to locate the common title sequence portions shared by a plurality of multimedia files to obtain the beginning time of the substantial portion of each of the multimedia files. In this way, when a user is watching a multimedia file, the user can select to skip the title sequence portion of the multimedia file to start watching from the substantial portion of the multimedia file or watch an entire multimedia file, which effectively advances the user experience.

In order to make the features and advantages of the present invention more comprehensible, the present invention is further described in detail in the following with reference to the embodiments and the accompanying drawings.

DESCRIPTION OF THE EMBODIMENTS

Figure 1:
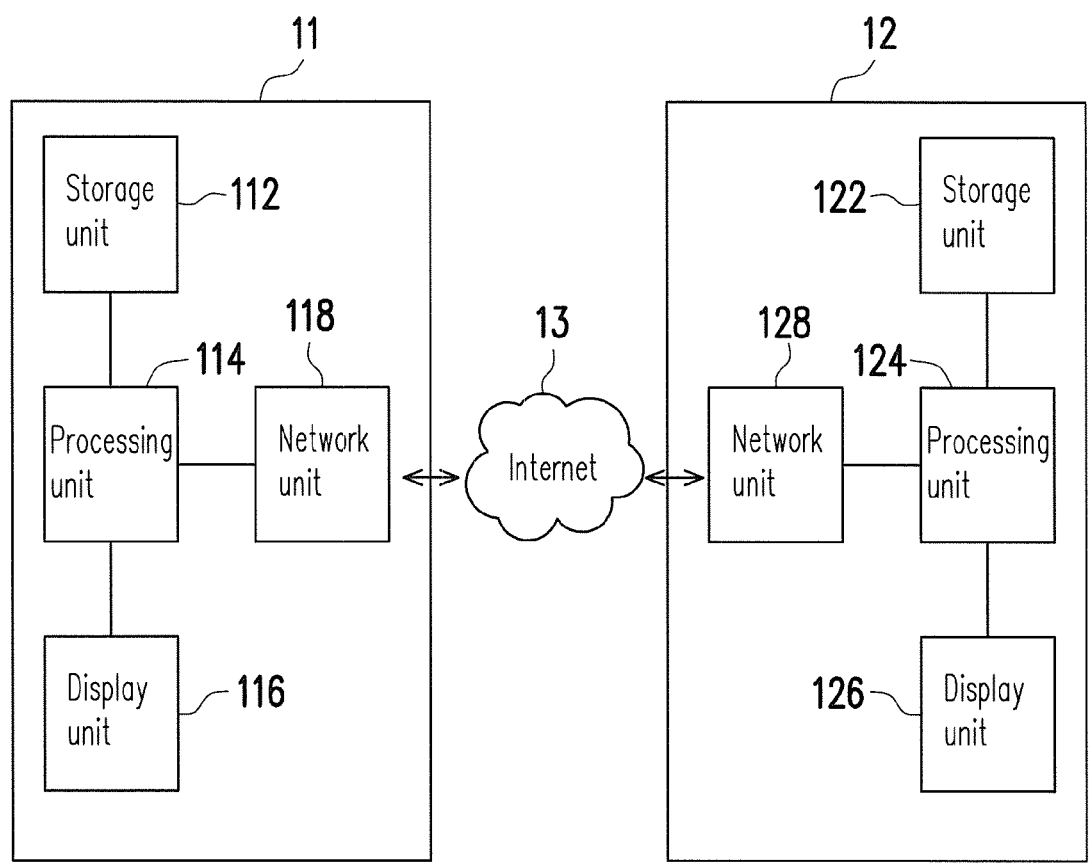
FIG. 1 is a schematic diagram of an electronic device and a multimedia file sharing system according to an exemplary embodiment of the present invention.

FIG. 1 is a schematic diagram of an electronic device and a multimedia file sharing system according to an exemplary embodiment of the present invention.

Referring to FIG. 1, in an exemplary embodiment, a multimedia file sharing system 10 includes an electronic device 11. The electronic device 11 may be a smart phone, a tablet PC, a notebook, a desktop PC, a smart TV, an Internet TV, a set top box (STB) or a DVD player all which have operation and data processing abilities.

The electronic device 11 includes a storage unit 112 and a processing unit 114. The storage unit 112 is coupled to the processing unit 114 for storing data. For example, the storage unit 112 may include built-in storage devices such as a random access memory (RAM), a Hard Disk Drive (HDD) and a flash memory. In addition, the storage unit 112 may also include external storage devices such as USB flash drive, a network drive and an external hard drive, which the invention is not limited to. The processing unit 114 is in charge of the major operation and data processing tasks of the electronic device 11. For example, the processing unit 114 may be a CPU or a microprocessor, which the invention is not limited to.

In an exemplary embodiment, when the electronic device 11 is the one of a smart phone, a tablet PC, a notebook, a desktop PC, an Internet TV or a smart TV all which have data processing and display function, the electronic device 11 may further include a display unit 116. The display unit 116 may be, for example, a screen of the electronic device 11 itself or a touch screen to display images. In addition, in an exemplary embodiment, when the electronic device 11 is the digital STB or the DVD player which is only an electronic device with data processing function but without display function, the display unit 116 may be, for example, an independent screen or a TV set and so on externally connected to the electronic device 11, which the invention is not limited to.

In an exemplary embodiment, the electronic device 11 may further include a network unit 118 to provide the electronic device 11 with cable communication, wireless communication and/or Internet connectivity. The network unit 118 may, for example, include a network interface card (NIC), or may include a wireless network adapter supporting wireless communication protocols such as Bluetooth, Wi-Fi (wireless compatibility certification) and/or 3G (third generation mobile communication technology). Further, the network unit 118 may include both the NIC and the wireless network adapter, which the invention is not limited to. In this way, the electronic device 11 is able to receive network packets from Internet 13 or send network packets to Internet 13.

In an exemplary embodiment, the electronic device 11 may also include common peripheries of electronic devices such as an audio output device (not shown), a signal input device (not shown) and a power supply (not shown). The audio output device of the electronic device 11 may, for example, include a speaker, the signal input device of the electronic device 11 may include a keyboard, a mouse, a touch pad and a remote control, and the power supply of the electronic device 11 may include a battery and a supply adapter, which are omitted to describe.

In an exemplary embodiment, the storage unit 112 stores N multimedia files therein, and the N multimedia files are, for example, the episodes No. 1-No. N of a TV series, wherein N is a positive integer. For example, when N is 12, it means the storage unit 112 stores the episodes No. 1-No. 12 of a TV series therein. Certainly, it may also mean the storage unit 112 stores any 12 episodes of the TV series, which the invention is not limited to.

The processing unit 114 may display N multimedia files stored at the storage unit 112. The processing unit 114 may, for example, read a multimedia file from the storage unit 112 and perform decoding and decompressing on the multimedia file. Then, the processing unit 114 makes the images of the multimedia file displayed through the display unit 116 and/or outputs the audio of the multimedia file through an audio output device such as the speaker thereof.

In an exemplary embodiment, the processing unit 114 may create a playing list in the storage unit 112. The playing list logs, for example, the file information of the N multimedia files stored in the storage unit 112 such as a file name of each of the multimedia files, a stored position of each of the multimedia files in a file system and/or a file format of each of the multimedia files. In addition, in an exemplary embodiment, the user may move a part or whole of the N multimedia files into a same folder of the file system, while the processing unit 114 may automatically add the file information of all the multimedia files located in the same folder into the playing list corresponding to the folder. In another exemplary embodiment, the processing unit 114 may also automatically add the multimedia files located in the same folder and named according to a specific file-naming rule into the playing list corresponding to the folder.

In an exemplary embodiment, the processing unit 114 may display the corresponding multimedia files according to the playing list. For example, assuming the playing list logs the file information of the N multimedia files, the processing unit 114 may sequentially display the N multimedia files according to a preset rule. The N multimedia files may, for example, follow a specific file-naming rule, so that the N multimedia files may be considered as the episodes of a same TV series through the file names thereof. After finishing the displaying of the current multimedia file, the processing unit 114 may continue to display the next episode multimedia file according to the file names of the N multimedia files. It is assumed, for example, file information of three multimedia files having file names such as "TV series name 1+Season No. 1+Episode No. 1", "TV series name 1+Season No. 1+Episode No. 2" and "TV series name 1+Season No. 1+Episode No. 3" are logged in the playing list. After the processing unit 114 finishes displaying the multimedia file of the episode No. 1 of the TV series, the processing unit 114 may display the multimedia file of the episode No. 2 of the TV series, and/or after finishing displaying the multimedia file of the episode No. 2 of the TV series, the processing unit 114 may continue to display the multimedia file of the episode No. 3 of the TV series.

Figure 2:
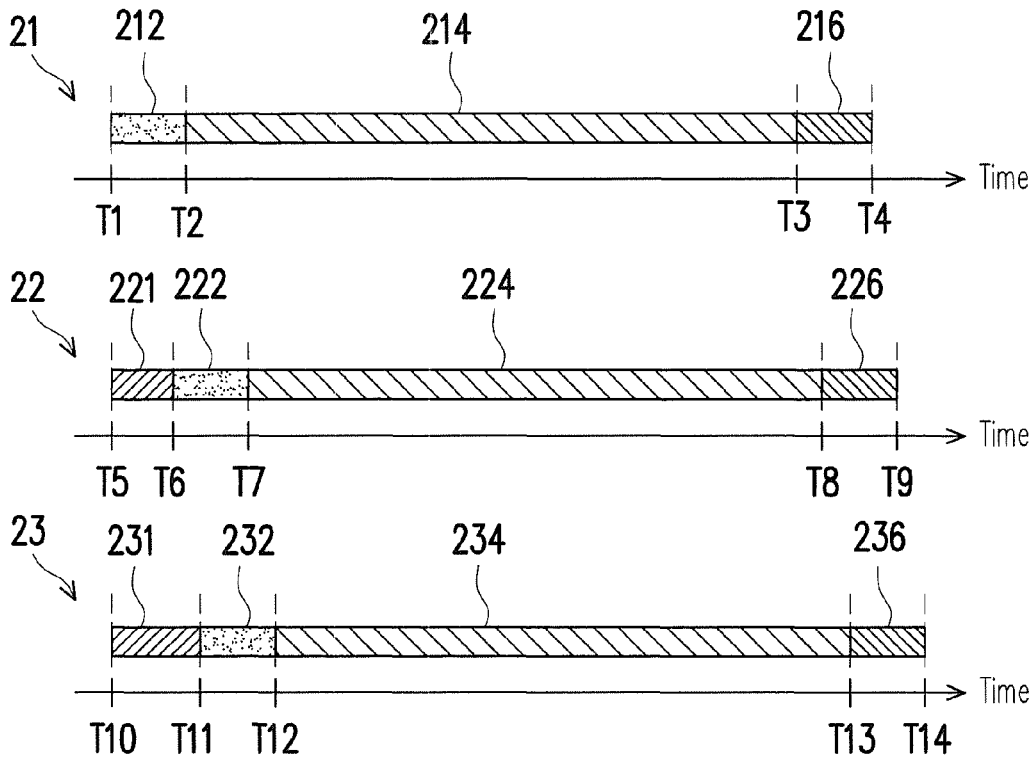
FIG. 2 is a schematic diagram showing several multimedia files according to an exemplary embodiment of the present invention.

FIG. 2 is a schematic diagram showing several multimedia files according to an exemplary embodiment of the present invention.

Referring to FIG. 2, it is assumed that a multimedia file 21 is the episode No. 1 of a TV series, a multimedia file 22 is the episode No. 2 of the TV series and a multimedia file 23 is the episode No. 3 of the TV series.

The multimedia file 21 includes an title sequence portion 212, a substantial portion 214 and an ending portion 216. The title sequence portion 212 is the front-most portion or the beginning portion of the multimedia file 21. The title sequence portion 212 at least includes a title sequence theme song. In addition, in an exemplary embodiment, the title sequence portion 212 may also include a movie title repeated in every episode of a same TV series and/or advertising fragments. For a plurality of episodes belonging to a same TV series, if no special reasons to replace or change the title sequence theme song, the movie title and/or the advertising fragments of the TV series, then the title sequence portion of every episode may be the same. The substantial portion 214 is the most important portion of the multimedia file 21, which contains the major file content of the multimedia file 21. Thus, for every episode of a same TV series, the substantial portion of each episode may be different from each other. The ending portion 216 is the last portion or the end-nearing portion of the multimedia file 21. Similarly to the title sequence portion 212, the ending portion 216 includes an ending theme song of the multimedia file 21. Similarly to the title sequence portion 212 again, in an exemplary embodiment, the ending portion 216 may also include a movie title/a trail of the next episode/advertising fragments which are repeated in every episode of a same TV series.

The multimedia file 22 includes an antecedent summary portion 221, a title sequence portion 222, a substantial portion 224 and an ending portion 226. The antecedent summary portion 221 includes partial content of the substantial portion 214 of the multimedia file 21 and is used mainly to allow the user reviewing the content of the last episode prior to watch the substantial portion 224 of the multimedia file 22. In addition, the title sequence portion 222, the substantial portion 224 and the ending portion 226 may refer to the depiction of the above mentioned title sequence portion 212, the substantial portion 214 and the ending portion 216, which is omitted to describe. Similarly to the multimedia file 22, the multimedia file 23 includes an antecedent summary portion 231, an title sequence portion 232, a substantial portion 234 and an ending portion 236, which is omitted to describe. Since the antecedent summary portion 221 of the multimedia file 22 includes partial content of the substantial portion 214 of the multimedia file 21 and the antecedent summary portion 231 of the multimedia file 23 includes partial content of the substantial portion 224 of the multimedia file 22, so that the antecedent summary portion 221 of the multimedia file 22 may be different from the antecedent summary portion 231 of the multimedia file 23.

Assuming the full-length of the multimedia file 21 is time-length between time T1 and time T4, the full-length of the multimedia file 22 is time-length between time T5 and time T9 and the full-length of the multimedia file 23 is time-length between time T10 and time T14, then in the multimedia file 21, the title sequence portion 212 includes the content of the multimedia file 21 between the time T1 and the time T2, the substantial portion 214 includes the content of the multimedia file 21 between the time T2 and the time T3, and the ending portion 216 includes the content of the multimedia file 21 between the time T3 and the time T4. In the multimedia file 22, the antecedent summary portion 221 includes the content of the multimedia file 22 between the time T5 and the time T6, the title sequence portion 222 includes the content of the multimedia file 22 between the time T6 and the time T7, the substantial portion 224 includes the content of the multimedia file 22 between the time T7 and the time T8, and the ending portion 226 includes the content of the multimedia file 22 between the time T8 and the time T9. In the multimedia file 23, the antecedent summary portion 231 includes the content of the multimedia file 23 between the time T10 and the time T11, the title sequence portion 232 includes the content of the multimedia file 23 between the time T11 and the time T12, the substantial portion 234 includes the content of the multimedia file 23 between the time T12 and the time T13, and the ending portion 236 includes the content of the multimedia file 23 between the time T13 and the time T14.

In an exemplary embodiment, the processing unit 114 may sequentially display the multimedia files 21-23 according to a playing list. For example, after the multimedia file 21 is displayed and when the time T4 is reached, it means the multimedia file 21 has been displayed completely, so that the processing unit 114 may check the playing list, and continue to display the multimedia file 22 from the time T5. After the multimedia file 22 is displayed and when the time T9 is reached, it means the multimedia file 22 has been displayed completely, so that the processing unit 114 may check the playing list, and continue to display the multimedia file 23 from the time T10.

However, taking the multimedia file 22 as an example, since the major content of the multimedia file 22 is the content in the substantial portion 224, so that during displaying the multimedia file 22 by the processing unit 114, the user may wish the processing unit 114 to skip the antecedent summary portion 221 and the title sequence portion 222 of the multimedia file 22 to directly display the substantial portion 224 of the multimedia file 22. In addition, during watching the multimedia file 23, the user may wish the processing unit 114 to directly display the substantial portion 234 of the multimedia file 23.

As a result, in an exemplary embodiment, the processing unit 114 may obtain a first portion feature data from at least one episode of a TV series for identifying a first portion of every episode of the TV series, and then the processing unit 114 is able to identify a first portion of each the episode of the TV series corresponding to the first portion feature data. Thereafter, during displaying an episode of the TV series, the processing unit 114 may skip the first portion of the episode to directly display the content of the second portion of the episode.

Figure 3:
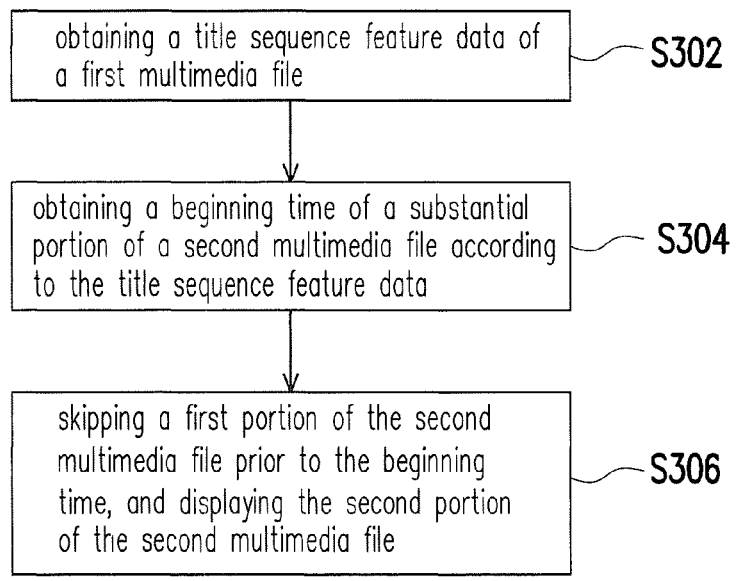
FIG. 3 is a flowchart showing the method for skipping a title sequence of a multimedia file according to an exemplary embodiment of the present invention.

FIG. 3 is a flowchart showing the method for skipping title sequence of a multimedia file according to an exemplary embodiment of the present invention and the method is for the electronic device 11.

Referring to FIGS. 1 and 3, in step S302, the processing unit 114 obtains first portion feature data of a multimedia file (in following, it is collectively named as the first multimedia file). Since the first portion of a multimedia file is mostly related to the title sequence portion of the multimedia file, for better understanding, the first portion feature data is collectively named as the title sequence feature data in following. For example, the title sequence feature data may include one of the waveform of the audio signal of the title sequence portion of the first multimedia file and/or the waveform of the video signal of the title sequence portion of the first multimedia file. In following, the waveform of the audio signal is taken as an example to explain some exemplary embodiments of the invention.

Figure 4:
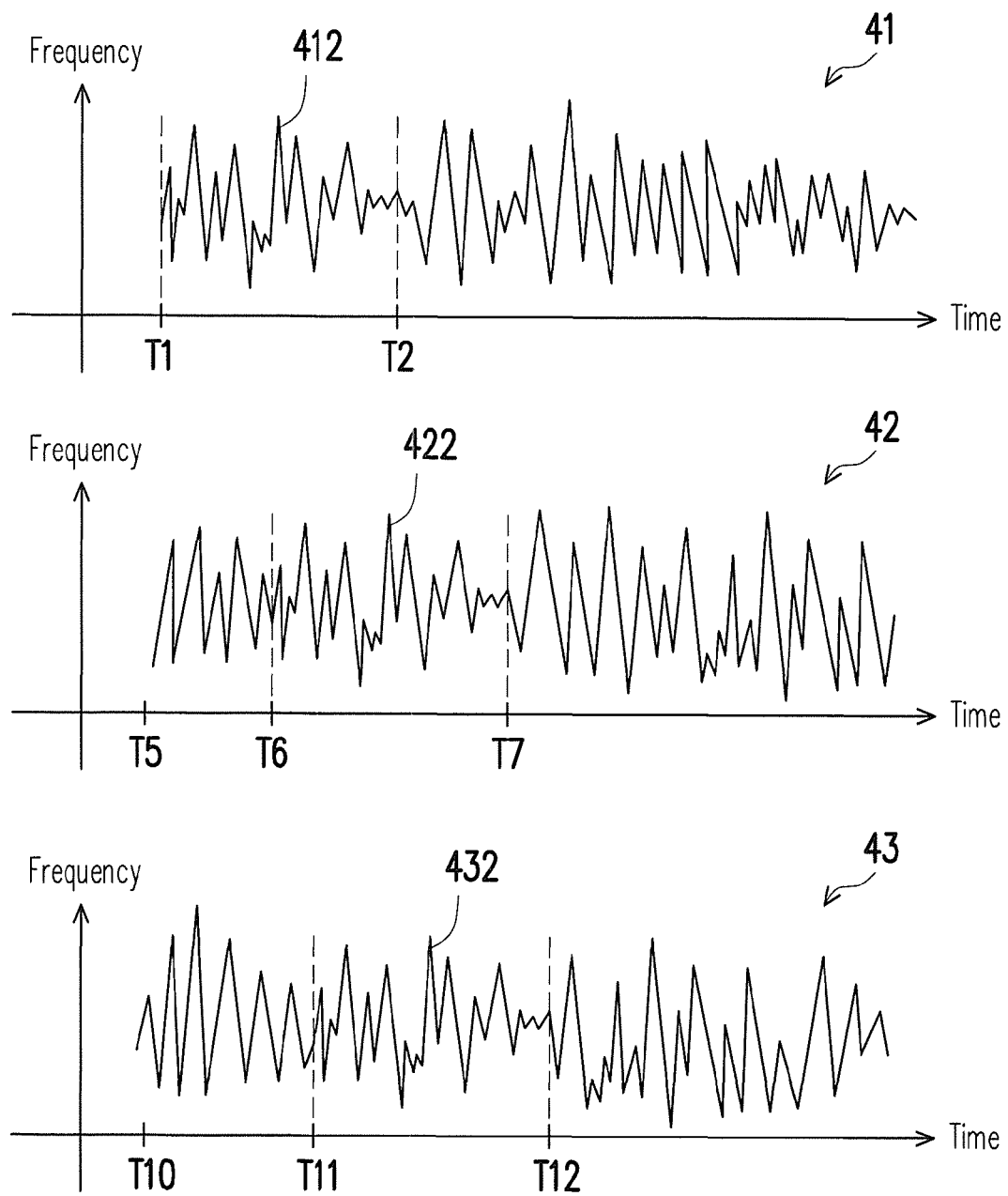
FIG. 4 is a diagram showing the audio signal waveforms of three multimedia files according to an exemplary embodiment of the present invention.

FIG. 4 is a diagram showing the audio signal waveforms of three multimedia files according to an exemplary embodiment of the present invention.

Referring to FIGS. 2 and 4, it is assumed that the waveform 41 is partial waveform of the audio signal of the multimedia file 21, the waveform 42 is partial waveform of the audio signal of the multimedia file 22 and the waveform 43 is partial waveform of the audio signal of the multimedia file 23.

In an exemplary embodiment, the processing unit 114 may receive a parameter of the setting operation of the user. For example, the processing unit 114 may display the images of the first multimedia file through the display unit 116 and/or output the audio of the first multimedia file through the speaker or other audio output devices. Then, while the user is watching the images and/or listening the audio of the multimedia file 21, the user may perform the setting operation to set the time T1 and the time T2 through the signal input device of the electronic device 11.

Next, the processing unit 114 may determine the beginning time of the first portion of the multimedia file 21 and the ending time of the first portion of the multimedia file 21 according to the parameter of the setting operation. For example, the processing unit 114 may set the time T1 as the beginning time of the first portion of the multimedia file 21 and set the time T2 as the ending time of the first portion of the multimedia file 21 according to the parameter of the setting operation performed by the user. Then, the processing unit 114 analyzes the content of the multimedia file 21 regarding the beginning time of the first portion and the ending time of the first portion to obtain the title sequence feature of the multimedia file 21. For example, the processing unit 114 may obtain the waveform 412 by analyzing the audio signal of the multimedia file 21 between the time T1 and the time T2, in which the waveform 412 between the time T1 and the time T2 is corresponding to the title sequence portion 212 of the multimedia file 21.

Referring to FIGS. 1 and 3, in step S304, the processing unit 114 obtains the beginning time of a second portion of another multimedia file (in following, it is collectively named as the second multimedia file) according to the obtained title sequence feature data. Since the second portion of a multimedia file is mostly related to the substantial portion of the multimedia file, for better understanding, the beginning time of the second portion is collectively named as the beginning time of the substantial portion. For example, in an exemplary embodiment, the processing unit 114 may match the obtained title sequence feature data with the second multimedia file to obtain the portion in the second multimedia file which is consistent with the title sequence feature data. Further, the processing unit 114 may determine the ending time of the portion in the second multimedia file which is consistent with the title sequence feature as the beginning time of the substantial portion of the second multimedia file.

Referring to FIGS. 2 and 4, in an exemplary embodiment, the processing unit 114 may match the waveform 41 of the multimedia file 21 with the complete waveform 42 of the multimedia file 22 or only match the waveform 412 between the time T1 and the time T2 of the multimedia file 21 with the complete waveform 42 of the multimedia file 22 to locate the portion in the waveform 42 of the multimedia file 22 which is the same as, overlapped with or almost overlapped with the waveform 412. For example, assuming the processing unit 114 is aware of the waveform 422 between the time T6 and the time T7 of the multimedia file 22 and the waveform 412 (i.e., the title sequence feature data) between the time T1 and the time T2 of the multimedia file 21 are overlapped or almost overlapped with each other, the processing unit 114 may set the time T7 as the beginning time of the substantial portion of the multimedia file 22. That is, when the multimedia file 22 is displayed to reach the time T7, the substantial portion 224 of the multimedia file 22 begins. In addition, the processing unit 114 may log, for example, the obtained beginning time of the substantial portion (i.e., T7) of the multimedia file 22 in a log table or may make a specific time label corresponding to the time T7 embedded into the multimedia file 22.

Referring to FIGS. 1 and 3 again, in step S306, the processing unit 114 skips the first portion of the second multimedia file prior to the beginning time of the second portion of the second multimedia file to display the second portion of the second multimedia file, in which the second portion of the second multimedia file is, for example, the portion of the second multimedia file following the beginning time of the second portion of the second multimedia file and it may be adjusted according to the demand in the practice. Taking FIG. 2 as an example, when the processing unit 114 is going to display the multimedia file 22, the processing unit 114 may check the log table to obtain the beginning time of the substantial portion (i.e., T7) of the multimedia file 22. When the multimedia file 22 is started for displaying, the processing unit 114 skips the antecedent summary portion 221 and the title sequence portion 222 of the multimedia file 22 prior to the beginning time of the substantial portion (i.e., T7), and directly displays the substantial portion 224 after the beginning time of the substantial portion (i.e., T7). In addition, in an exemplary embodiment, if the beginning time of the substantial portion of the multimedia file 22 has been embedded into the multimedia file 22 in form of the specific time label, then during displaying the multimedia file 22, the processing unit 114 may search for the time T7 corresponding to the specific time label in the multimedia file 22 so as to directly display the substantial portion 224 of the multimedia file 22 from the time T7.

That is, even the time for each the multimedia file to enter the second portion thereof is different from each other, the invention still can precisely find out the beginning time of the second portion of each the multimedia file having the same first portion by matching the first portion feature data. For example, the processing unit 114 may quickly locate the beginning time of the substantial portion of every multimedia file by checking the log table, which may effectively reduce the disadvantage in prior art that it needs manually setting or only one fixed time is set.

Referring to FIGS. 2 and 4 again, after determining the beginning time of the second portion of the multimedia file 22, the processing unit 114 may further match the waveform 412 (i.e., the title sequence feature data) of the multimedia file 21 with the waveform 43 of the multimedia file 23 according to the file information logged in the playing list, and obtains the waveform 432 between the times T11 and T12 overlapped with the waveform 412. Then, the processing unit 114 may set the time T12 as the beginning time of the second portion of the multimedia file 23 according to the waveform 432.

Since the first portion of a multimedia file is generally located at the front-most section or the starting section of a multimedia file, so that, in an exemplary embodiment, prior to matching the first portion feature data with the second multimedia file, the processing unit 114 may determine a matching duration (for example, five minutes) first, in which the determined matching duration is less than the full-length of the second multimedia file. Further, the processing unit 114 only match the first portion feature data with the content of the second multimedia file within the matching duration, which advances the matching speed.

Figure 5:
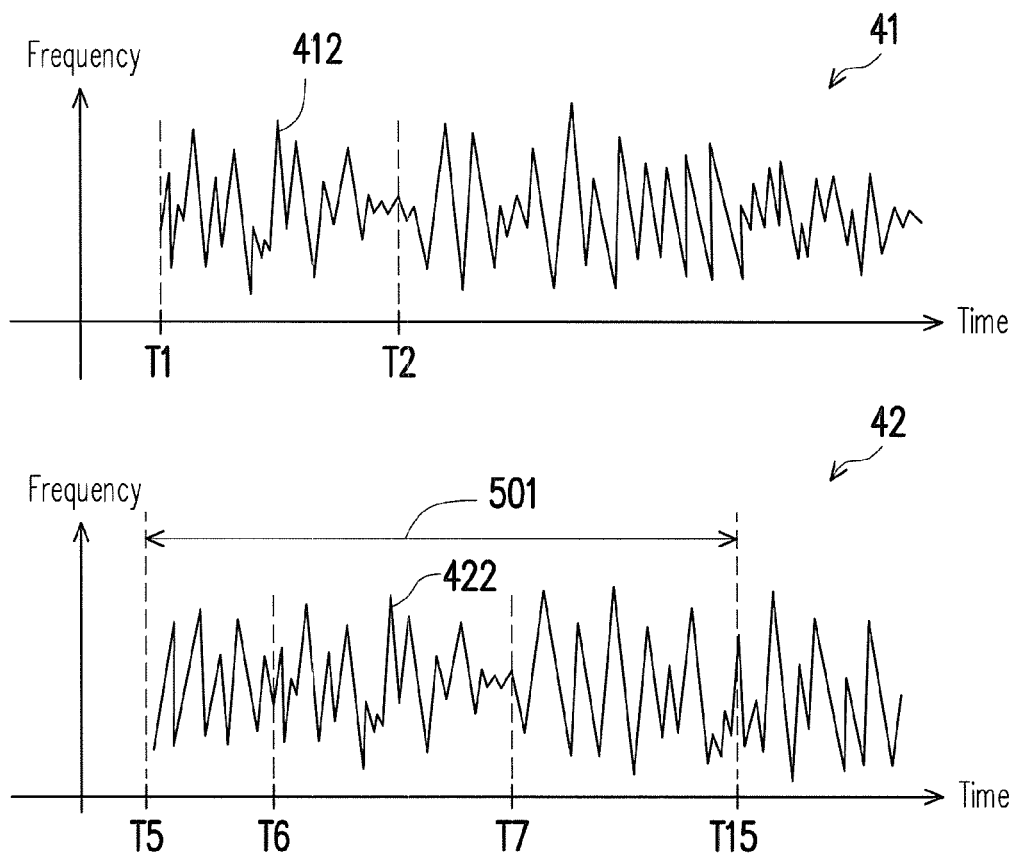
FIG. 5 is a diagram showing the audio signal waveforms of two multimedia files according to an exemplary embodiment of the present invention.

FIG. 5 is a diagram showing the audio signal waveforms of two multimedia files according to an exemplary embodiment of the present invention.

Referring to FIGS. 2 and 5, in an exemplary embodiment, it is assumed the processing unit 114 sets the time length between the time T5 and the time T15 as a matching duration 501, wherein the time length of the matching duration 501 is less than the full-length of the multimedia file 22 (i.e., the time length between the times T5 and T9 in FIG. 2). In an exemplary embodiment, the beginning time of the matching duration 501 is substantially same as the beginning time of the multimedia file 22, for example, both the beginning time of the matching duration 501 and the beginning time of the multimedia file 22 are the time T5, and a slight error is allowable.

The processing unit 114 may obtain a file content to be matched of the multimedia file 22 in the matching duration 501. For example, the processing unit 114 may obtain waveform of audio signal of the multimedia file 22 between the time T5 and the time T15 (i.e., partial waveform of the waveform 42 between the time T5 and the time T15). Then, the processing unit 114 matches the title sequence feature data of the first multimedia file with the file content to be matched of the second multimedia file to obtain a portion in the second multimedia file which is consistent with the title sequence feature data. For example, the processing unit 114 may match the waveform 412 with the portion of the waveform 42 between the time T5 and the time T15 only. Since a reduced data volume to be matched, the processing unit 114 may speed the procedure of locating the ending time of the waveform 422 (i.e., the time T7).

In an exemplary embodiment, the processing unit 114 may skip a third portion of a multimedia file in the similar way as the depiction above. The third portion of the multimedia file is mostly related to ending portion of a multimedia file. For better understanding, the third portion is collectively named as the ending portion in following. Referring to FIG. 3, in an exemplary embodiment, the user may firstly set a beginning time of an ending portion 216 of the multimedia file 21 (i.e., the time T3). Then, the processing unit 114 obtains an ending feature data corresponding to the ending portion 216 (for example, the waveform of audio signal of the multimedia file 21 between the time T3 and the time T4). After that, the processing unit 114 obtains an ending time of the substantial portion of the multimedia file 22 (i.e., the time T8) by matching the ending feature data with the multimedia file 22, and when the displaying of the multimedia file 22 reaches the ending time of the substantial portion (i.e., the time T8), the processing unit 114 skips the ending portion 226 to directly display the multimedia file 23.

In addition, in an exemplary embodiment, the processing unit 114 allows the user to optionally determine whether or not to activate the corresponding skipping function, and the processing unit 114, according to the determination of the user, determines whether or not to skip the title sequence portion and/or the ending portion of the movie.

Although the above-mentioned exemplary embodiment takes the waveform of the audio signal as an example, but in other unmentioned embodiments, the title sequence feature data may be at least one of the waveform of the video signal, the volume of the audio signal data, the volume of the image signal data, the characteristic value of the video signal, the characteristic value of the audio signal of the title sequence portion of a multimedia file, depending on the practice demand.

The invention does not limit the above-mentioned exemplary embodiments.

Referring to FIG. 1 again, in an exemplary embodiment, a multimedia file sharing system 10 includes a multimedia file sharing device 12. The multimedia file sharing device 12 is, for example, a computer host or a multimedia file sharing platform composed of a plurality of computer hosts connected to each other in cable connection or wireless connection. The multimedia file sharing device 12 may provide multimedia files to the electronic device 11 through Internet 13, for example, the multimedia file sharing device 12 may include an online video provider website or applications. When the electronic device 11 asks browsing or downloading a multimedia file from the multimedia file sharing device 12, the multimedia file sharing device 12 may deliver the multimedia file to the electronic device 11 in streaming mode.

The multimedia file sharing device 12 includes at least a storage unit 122, a processing unit 124 and a network unit 128. In addition, in an exemplary embodiment, the multimedia file sharing device 12 may also include a display unit 126. The storage unit 122, the processing unit 124, the display unit 126 and the network unit 128 are respectively same as or similar to the storage unit 112, the processing unit 114, the display unit 116 and the network unit 118, which the invention is not limited to.

Figure 6:
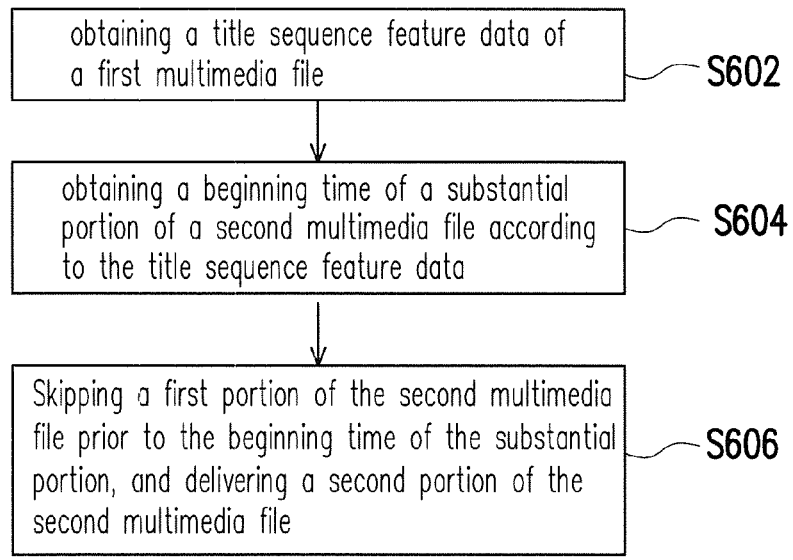
FIG. 6 is another flowchart showing the method for skipping a title sequence of a multimedia file according to an exemplary embodiment of the present invention.

FIG. 6 is another flowchart showing the method for skipping title sequence of a multimedia file according to an exemplary embodiment of the present invention, and the method is for the multimedia file sharing device 12.

Referring to FIGS. 1 and 6, in step S602, a first portion feature data of a first multimedia file is obtained by the multimedia file sharing device 12 (or the processing unit 124). Since the first portion of a multimedia file is mostly related to the title sequence portion of the multimedia file, for better understanding, the first portion feature data is collectively named as the title sequence feature data in following. The first multimedia file is stored, for example, in the storage unit 112.

Nest in step S604, the multimedia file sharing device 12 (or the processing unit 124) obtains the beginning time of a second portion of a second multimedia file according to the title sequence feature data. Since the second portion of a multimedia file is mostly related to the substantial portion of the multimedia file, for better understanding, the beginning time of the second portion is collectively named as the beginning time of the substantial portion in following. The second multimedia file is also stored, for example, in the storage unit 112. Steps S602 and 604 are respectively same as or similar to steps S302 and S304 in FIG. 3, which the invention is not limited to. Thus, after steps S602 and S604, the multimedia file sharing device 12 (or the processing unit 124) obtains a beginning time of the substantial portion of each of at least partial multimedia files stored in the storage unit 112, and the obtained beginning time of the substantial portion of the at least partial multimedia files are respectively logged in a corresponding log table.

In step S606, when the multimedia file sharing device 12 (or the processing unit 124) is going to deliver the second multimedia file to the electronic device 11 through the network unit 128, the multimedia file sharing device 12 (or the processing unit 124) may skip the first portion of the second multimedia file prior to the beginning time of the substantial portion, and only deliver the second portion of the second multimedia file to the electronic device 11, in which the second portion of the second multimedia file is, for example, the portion of the second multimedia file following the beginning time of the substantial portion and it may be adjusted according to the demand in the practice. Taking FIG. 2 as an example, the multimedia file sharing device 12 (or the processing unit 124) skips, for example, the antecedent summary portion 221 and the title sequence portion 222 of the multimedia file 22 prior to the time T7 and only delivers the substantial portion 224 and the ending portion 226 of the multimedia file 22 to the electronic device 11.

That is, in an exemplary embodiment, even the electronic device 11 does not have the above-mentioned function of automatically searching for the beginning time of the substantial portion of a movie, the electronic device 11 still can directly receive the multimedia file without the title sequence portion from the multimedia file sharing device 12 and can directly display the substantial portion of the multimedia file through a browser or a multimedia player.

The invention does not limit the above-mentioned exemplary embodiments.

Figure 7:
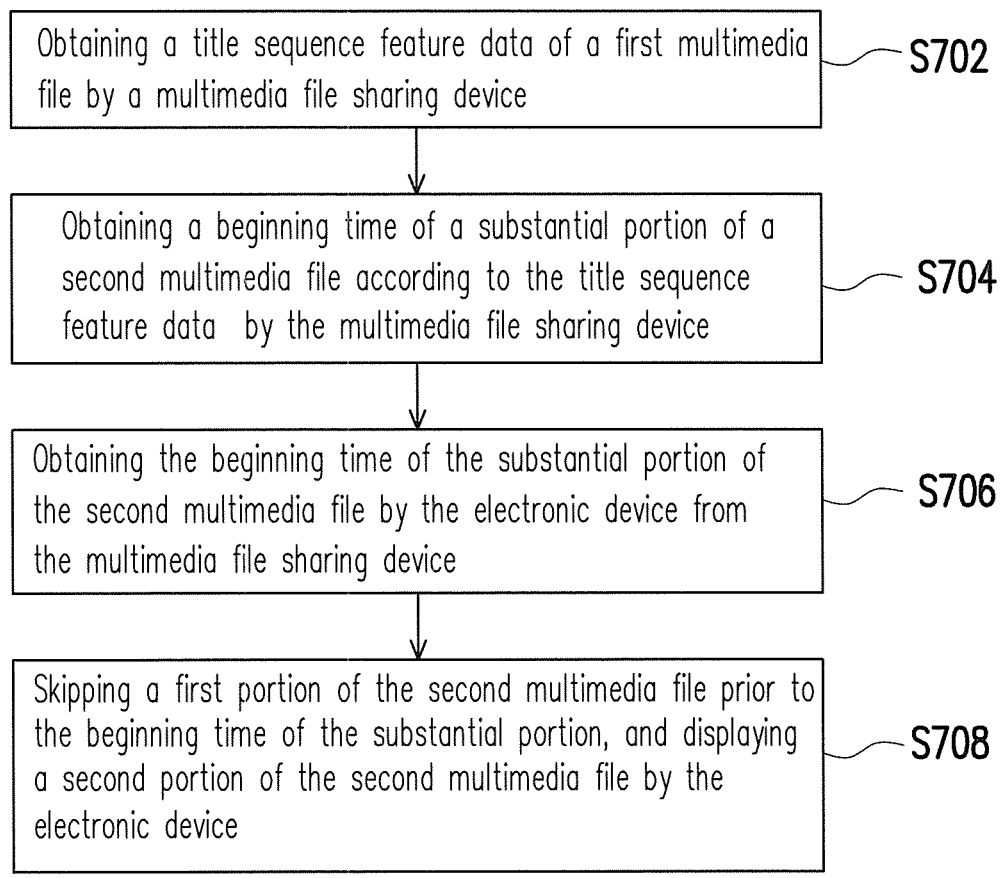
FIG. 7 is yet another flowchart showing the method for skipping a title sequence of a multimedia file according to an exemplary embodiment of the present invention.

FIG. 7 is yet another flowchart showing the method for skipping title sequence of a multimedia file according to an exemplary embodiment of the present invention and the method is for the multimedia file sharing system 10.

Referring to FIGS. 1 and 7, in step S702, a first portion feature data of the first multimedia file is obtained by the multimedia file sharing device 12 (or the processing unit 124). Since the first portion of a multimedia file is mostly related to the title sequence portion of the multimedia file, for better understanding, the first portion feature data is collectively named as the title sequence feature data in following. The first multimedia file is stored, for example, in the storage unit 122.

Nest in step S704, the multimedia file sharing device 12 (or the processing unit 124) obtains the beginning time of the second portion of the second multimedia file according to the title sequence feature data. Since the second portion of a multimedia file is mostly related to the substantial portion of the multimedia file, for better understanding, the beginning time of the second portion is collectively named as the beginning time of the substantial portion in following. The second multimedia file is also stored, for example, in the storage unit 122. Steps S702 and S704 are respectively same as or similar to steps S602 and S604 in FIG. 6, which the invention is not limited to.

In step S706, the electronic device 11 (or the processing unit 114) obtains the beginning time of the substantial portion of the second multimedia file from the multimedia file sharing device 12. For example, the electronic device 11 (or the processing unit 114) may download the beginning time of the substantial portion of the second multimedia file from the log table of the multimedia file sharing device 12 through the network unit 118. In addition, when the electronic device 11 (or the processing unit 114) downloads the second multimedia file from the multimedia file sharing device 12, the step S706 is executed. Alternatively, in an exemplary embodiment, the electronic device 11 (or the processing unit 114) may also actively ask to download the beginning time of the substantial portion of the second multimedia file from the multimedia file sharing device 12 according to the second multimedia file already stored in the electronic device 11, which the invention is not limited to.

Then in step S708, the electronic device 11 (or the processing unit 114) may skip the first portion of the second multimedia file prior to the beginning time of the substantial portion and display the second portion of the second multimedia file only, in which the second portion of the second multimedia file is, for example, the portion of the second multimedia file following the beginning time of the substantial portion, which may be adjusted according to the demand in the practice.

That is, in an exemplary embodiment, even the electronic device 11 does not have the above-mentioned function of automatically searching for the beginning time of the substantial portion for a movie and the multimedia file sharing device 12 does not have the function of delivering the multimedia file content following the beginning time of the substantial portion too or the function is shut down, the electronic device 11 still may download the beginning time of the substantial portion of a multimedia file when receiving the multimedia file from the multimedia file sharing device 12. Optionally, in an exemplary embodiment, the electronic device 11 may also, at any time, actively ask to download the beginning time of the substantial portion of a multimedia file and so on from the multimedia file sharing device 12, which the invention is not limited to. Thereafter, the electronic device 11 may directly display the substantial portion of the multimedia file through the browser or the multimedia player thereof according to the downloaded beginning time of the substantial portion of the multimedia file.

It should be noted that in an exemplary embodiment, the processing unit 114 and/or the processing unit 124 may respectively include a hardware circuit for executing the above-mentioned function; or in an exemplary embodiment, the storage unit 112 and/or the storage unit 122 stores a corresponding software module and/or a corresponding firmware module therein. When the software module and/or the firmware module are loaded to the processing unit 114 and/or the processing unit 124, the processing unit 114 and/or the processing unit 124 execute all the steps in the method for skipping the title sequence of a multimedia file in the above-mentioned exemplary embodiments.

In summary, the invention may perform the matching operation to locate the common title sequence portions shared by a plurality of multimedia files by the electronic device at a client or a multimedia file sharing device at a server to obtain the beginning time of the substantial portion of each of the multimedia files. In this way, when a user at the client is watching multimedia files, the user may select to skip the title sequence portion of each of the multimedia files and start watching from the substantial portion of each of the multimedia files or watch an entire multimedia file, which effectively advances the user experience.

Since the invention does not limit what device to perform the matching operation, and the device may be, for example, an electronic device of a client or a multimedia file sharing device of a server, so that the invention may be directly used in various electronic devices with multimedia file playing function or multimedia file playing software on the present market.

The above described are preferred embodiments of the present invention only, which do not limit the implementation scope of the present invention. It will be apparent to those skilled in the art that various modifications and equivalent variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for skipping title sequence of a multimedia file, for an electronic device, comprising:
    obtaining, by a processor of the electronic device, a first portion feature data of a first multimedia file, wherein the first multimedia file at least comprises a first portion, wherein the first portion feature data corresponds to a file content of the first portion of the first multimedia file;
    obtaining, by the processor of the electronic device, a beginning time of a second portion of a second multimedia file according to the first portion feature data, wherein a file content of a first portion of the second multimedia file prior to the beginning time is consistent with the first portion feature data; and
    skipping, by the processor of the electronic device, the first portion of the second multimedia file prior to the beginning time of the second portion, and displaying the second portion of the second multimedia file when the second multimedia file is played,
    wherein a file content of the entire skipped portion of the second multimedia file is the same with the file content of the first portion of the first multimedia file.

2. The method for skipping title sequence of a multimedia file as claimed in claim 1, wherein the step of obtaining the first portion feature data of the first multimedia file comprises:
    receiving a parameter of setting operation;
    determining a beginning time of the first portion of the first multimedia file and an ending time of the first portion of the first multimedia file according to the parameter; and
    analyzing the first multimedia file regarding the beginning time of the first portion and the ending time of the first portion to obtain the first portion feature data of the first multimedia file.

3. The method for skipping title sequence of a multimedia as claimed in claim 1, wherein the first portion feature data comprises waveform of an audio signal and/or waveform of video signal of the first portion of the first multimedia file.

4. The method for skipping title sequence of a multimedia file as claimed in claim 1, wherein the step of obtaining the beginning time of the second portion of the second multimedia according to the first portion feature data of the first multimedia comprises:
    matching the first portion feature data of the first multimedia file with the second multimedia to obtain a portion in the second multimedia file which is consistent with the first portion feature data of the first multimedia file; and
    determining an ending time of the portion in the second multimedia file which is consistent with the first portion feature data of the first multimedia file as the beginning time of the second portion of the second multimedia file.

5. The method for skipping title sequence of a multimedia file as claimed in claim 4, wherein the step of matching the first portion feature data of the first multimedia with the second multimedia to obtain the portion in the second multimedia which is consistent with the first portion feature data of the first multimedia comprises:

determining a matching duration, wherein the matching duration is less than a full-length of the second multimedia file;

obtaining a file content to be matched of the second multimedia file in the matching duration; and matching the first portion feature data with the file content to be matched to obtain the portion in the second multimedia file which is consistent with the first portion feature data of the first multimedia file.

6. The method for skipping title sequence of a multimedia file as claimed in claim 5, wherein a beginning time of the matching duration is substantially same as a beginning time of the second multimedia file.

7. An electronic device, comprising:

a storage unit, used for storing a first multimedia file and a second multimedia file; and a processor, coupled to the storage unit for obtaining a first portion feature data of the first multimedia file, wherein the first multimedia file at least comprises a first portion, wherein the first portion feature data corresponds to a file content of the first portion of the first multimedia file, wherein the processor is further for obtaining a beginning time of a second portion of the second multimedia file according to the first portion feature data, wherein a file content of a first portion of the second multimedia file prior to the beginning time is consistent with the first portion feature data, wherein the processor is further for skipping the first portion of the second multimedia file prior to the beginning time of the second portion, and displaying the second portion of the second multimedia file when the second multimedia file is played, wherein a file content of the entire skipped portion of the second multimedia file is the same with the file content of the first portion of the first multimedia file.

8. The electronic device as claimed in claim 7, wherein the processor is further for receiving a setting operation parameter and determining a beginning time of the first portion of the first multimedia file and an ending time of the first portion of the first multimedia file according to the setting operation parameter, wherein the processor is further for analyzing the first multimedia file regarding the beginning time of the first portion and the ending time of the first portion to obtain the first portion feature data of the first multimedia file.

9. The electronic device as claimed in claim 7, wherein the first portion feature data comprises waveform of an audio signal and/or waveform of video signal of the first portion of the first multimedia file.

10. The electronic device as claimed in claim 7, wherein the processor is further for matching the first portion feature data of the first multimedia file with the second multimedia file to obtain a portion in the second multimedia file which is consistent with the first portion feature data of the first multimedia file, wherein the processor is further for determining an ending time of the portion in the second multimedia file which is consistent with the first portion feature data of the first multimedia file as the beginning time of the second portion of the second multimedia file.

11. The electronic device as claimed in claim 10, wherein the processor is further for determining a matching duration, and the matching duration is less than a full-length of the second multimedia file, wherein the processor is further for obtaining a file content to be matched of the second multimedia file in the matching duration, wherein the processor is further for matching the first portion feature data with the file content to be matched to obtain the portion in the second multimedia file which is consistent with the first portion feature data of the first multimedia file.

12. The electronic device as claimed in claim 11, wherein a beginning time of the matching duration is substantially same as a beginning time of the second multimedia file.

13. An electronic device, comprising:

a network unit, used for receiving a second multimedia file from a multimedia file sharing device via Internet;

a storage unit, used for storing the second multimedia file; and a processor, coupled to the network unit and the storage unit for obtaining a beginning time of a second portion of the second multimedia file from the multimedia file sharing device through the network unit, wherein a file content of a first portion of the second multimedia file prior to the beginning time is consistent with a first portion feature data corresponding to a file content of a first portion of a first multimedia file, wherein the processor is further for skipping the first portion of the second multimedia file prior to the beginning time of the second portion of the second multimedia file, and displaying the second portion of the second multimedia file when the second multimedia file is played, wherein a file content of the entire skipped portion of the second multimedia file is the same with the file content of the first portion of the first multimedia file.

14. The electronic device as claimed in claim 13, wherein the beginning time of the second portion of the second multimedia file is obtained by the multimedia file sharing device according to the first portion feature data of the first multimedia file, wherein the first portion feature data of the first multimedia file is obtained by the multimedia file sharing device through analyzing the first multimedia file regarding a beginning time of the first portion of the first multimedia file and an ending time of the first portion of the first multimedia file.

15. The electronic device as claimed in claim 13, wherein the beginning time of the second portion of the second multimedia file is decided by the multimedia file sharing device according to an ending time of a portion in the second multimedia file which is consistent with the first portion feature data of the first multimedia file.

16. The electronic device as claimed in claim 15, wherein the portion in the second multimedia file consistent with the first portion feature data of the first multimedia file is obtained by the multimedia file sharing device through matching the first portion feature data with a file content to be matched of the second multimedia file in a matching duration, wherein the matching duration is less than a full-length of the second multimedia file, and a beginning time of the matching duration is substantially same as a beginning time of the second multimedia file.

* * * * *